United States Patent
Kurihara et al.

(10) Patent No.: US 11,789,727 B2
(45) Date of Patent: Oct. 17, 2023

(54) CONVERSION APPARATUS, CONVERSION METHOD AND PROGRAM

(71) Applicant: NIPPON TELEGRAPH AND TELEPHONE CORPORATION, Tokyo (JP)

(72) Inventors: Shingo Kurihara, Tokyo (JP); Akira Kanamaru, Tokyo (JP); Gengo Suzuki, Tokyo (JP); Takuya Iwatsuka, Tokyo (JP); Satoshi Okada, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/773,034

(22) PCT Filed: Oct. 30, 2019

(86) PCT No.: PCT/JP2019/042639
§ 371 (c)(1),
(2) Date: Apr. 28, 2022

(87) PCT Pub. No.: WO2021/084657
PCT Pub. Date: May 6, 2021

(65) Prior Publication Data
US 2022/0398096 A1    Dec. 15, 2022

(51) Int. Cl.
*G06F 8/76* (2018.01)
*G06F 8/77* (2018.01)

(52) U.S. Cl.
CPC . *G06F 8/76* (2013.01); *G06F 8/77* (2013.01)

(58) Field of Classification Search
None
See application file for complete search history.

(56) References Cited

U.S. PATENT DOCUMENTS 9,460,171 B2 * 10/2016 Marrelli ................. G06F 16/258
9,461,969 B2 * 10/2016 Watt ..................... H04L 63/0272
(Continued)

OTHER PUBLICATIONS

Fleurey et al. (2007) "Model-Driven Engineering for Software Migration in a Large Industrial Context" MoDELS'07, Sep. 30, 2007.

*Primary Examiner* — Ryan D. Coyer

(57) ABSTRACT

A conversion apparatus improves utilization of definition information for system migration by including: a first conversion unit converting definition information about first rules for generating first data showing information about an operation of a migration source first system in a form depending on an implementation technique of the first system based on materials of the first system, according to a combination of first environment information showing an environment that the first system depends on and second environment information showing an environment that a migration destination second system depends on; a second conversion unit converting definition information about second rules for generating second data showing the information about the operation in a form not depending on a particular implementation technique based on the first data, according to the combination of the first environment information and the second environment information; and a third conversion unit converting definition information about third rules for generating third data showing the information about the operation in a form depending on an implementation technique of the second system based on the second data and the first data, according to the combination of the first environment information and the second environment information.

9 Claims, 11 Drawing Sheets

(56) References Cited

U.S. PATENT DOCUMENTS

| | | | |
|---|---|---|---|
| 2007/0256058 A1* | 11/2007 | Marfatia | G06F 8/51 |
| | | | 717/137 |
| 2009/0049438 A1* | 2/2009 | Draper | G06F 8/34 |
| | | | 717/168 |
| 2017/0192777 A1* | 7/2017 | Apte | G06F 8/76 |
| 2018/0357145 A1* | 12/2018 | Sarangapani | G06F 8/51 |
| 2021/0011688 A1* | 1/2021 | Sasidharan | G06F 8/10 |

* cited by examiner

CONVERSION APPARATUS, CONVERSION METHOD AND PROGRAM

CROSS-REFERENCE TO RELATED APPLICATIONS

This application is a U.S. National Stage Application filed under 35 U.S.C. § 371 claiming priority to International Patent Application No. PCT/JP2019/042639, filed on 30 Oct. 2019, the disclosure of which is hereby incorporated herein by reference in its entirety.

TECHNICAL FIELD

The present invention relates to a conversion apparatus, a conversion method and a program.

BACKGROUND ART

For a computer system such as a web system, a method called model-driven migration is known as a technique for implementing a new system by an implementation technique different from an implementation technique of an old system based on materials of the old system (Non-Patent Literature 1).

FIG. 1 is a diagram for illustrating a conventional technique. In the conventional technique, first, a model specific to an implementation technique of an old system is mechanically generated, with materials such as source codes and setting files of the old system as an input. After the generated model is converted to a generic intermediate model independent of a particular implementation technique, the intermediate model is converted to a model specific to an implementation technique of a new system. Lastly, source codes of the new system are generated from the model specific to the implementation technique of the new system. The generic intermediate model independent of a particular implementation technique includes a static data structure, algorithms of processes to be executed, a GUI and screen transitions.

However, though there are some parts where conversion between the models and creation of source codes from the models can be mechanically performed, it is not possible to, for parts where implementation is complicated, completely mechanically perform conversion or generation, and complementary work by human hands is required.

A logic shown in FIG. 1 will be referred to as "a migration logic" below for convenience.

CITATION LIST

Non-Patent Literature

Non-Patent Literature 1: Franck Fleurey, Erwan Breton, Benoit Baudry, Alain Nicolas, Jean-Marc Jezequel. Model-Driven Engineering for Software Migration in a Large Industrial Context. MoDELS'07, 2007, Nashville, Tenn., USA, United States. 2007.

SUMMARY OF THE INVENTION

Technical Problem

However, the range of reuse of a migration logic developed for a single development project is limited. Therefore, there is a problem that cost at the time of creating a migration logic for each project is not optimal.

That is, in the prior-art technique, a migration logic is created for each project along a concept of the model-driven migration. Though there may be a case where a part of a migration logic created for a similar project in the past can be utilized, the utilization range is limited. This is because, even if programming languages and coding notations are the same between similar projects, difference is increased due to difference between versions of the programming languages, libraries and the like used in the projects, or rules for conversion depend on requirements specific to the projects.

If such versions and the like can be fixed (can be caused to be the same between projects), utilization of a migration logic created for a previous project becomes possible. Actually, however, it is required as a requirement fora new system to be a system optimized by the latest version at that time point, and, therefore, it is not a realistic solution to simply fix a version.

The present invention has been made in view of the above problem, and an object is to improve utilization of definition information for system migration.

Means for Solving the Problem

Therefore, in order to solve the above problem, a conversion apparatus includes: a first conversion unit converting definition information about first rules for generating first data showing information about an operation of a migration source first system in a form depending on an implementation technique of the first system based on materials of the first system, according to a combination of first environment information showing an environment that the first system depends on and second environment information showing an environment that a migration destination second system depends on; a second conversion unit converting definition information about second rules for generating second data showing the information about the operation in a form not depending on a particular implementation technique based on the first data, according to the combination of the first environment information and the second environment information; and a third conversion unit converting definition information about third rules for generating third data showing the information about the operation in a form depending on an implementation technique of the second system based on the second data and the first data, according to the combination of the first environment information and the second environment information.

Effects of the Invention

It is possible to improve utilization of definition information for system migration.

DESCRIPTION OF EMBODIMENTS

Figure 1:
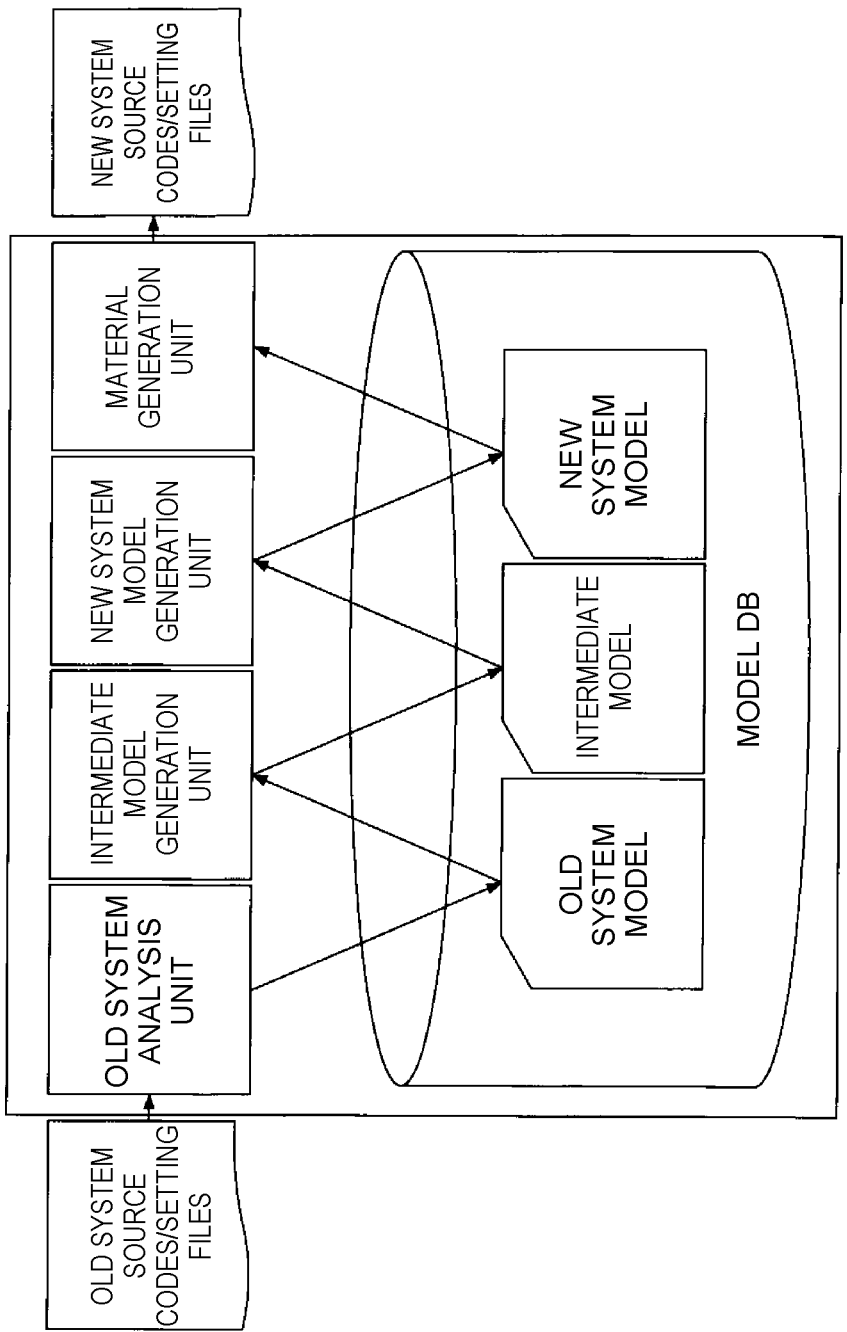
FIG. 1 is a diagram for illustrating a conventional technique.
Figure 2:
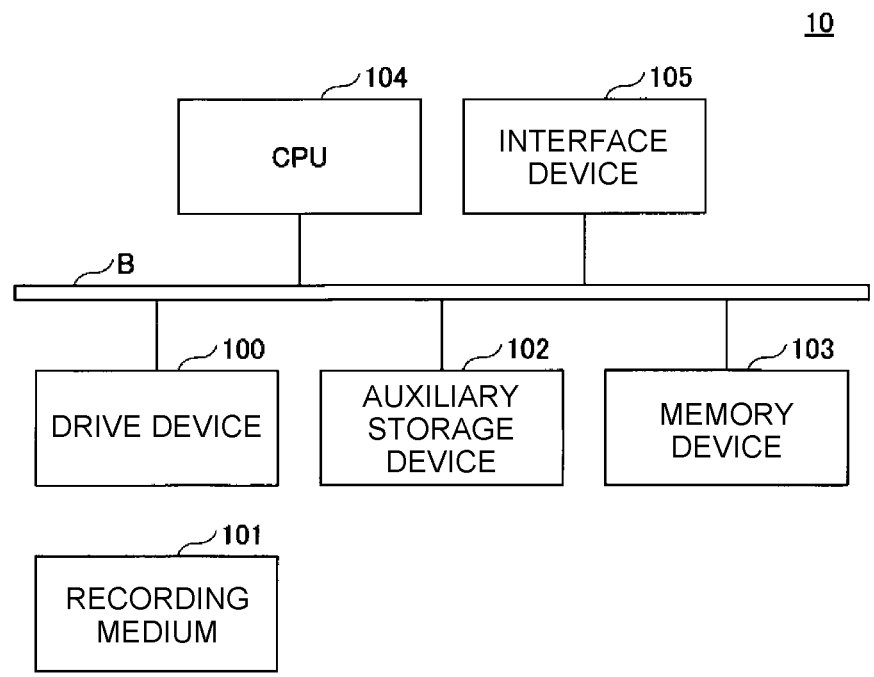
FIG. 2 is a diagram showing a hardware configuration example of a system migration support apparatus 10 in an embodiment of the present invention.

An embodiment of the present invention will be described below based on drawings. FIG. 2 is a diagram showing a hardware configuration example of a system migration support apparatus 10 in the embodiment of the present invention. The system migration support apparatus 10 in FIG. 2 is a computer having a drive device 100, an auxiliary storage device 102, a memory device 103, a CPU 104, an interface device 105 and the like that are mutually connected via a bus B.

A program that realizes processes in the system migration support apparatus 10 is provided by a recording medium 101 such as a CD-ROM. When the recording medium 101 that stores the program is set in the drive device 100, the program is installed into the auxiliary storage device 102 from the recording medium 101 via the drive device 100. However, installation of the program is not necessarily required to be performed from the recording medium 101. The program may be downloaded from another computer via a network. The auxiliary storage device 102 stores the installed program and stores necessary files, data and the like.

When an instruction to launch the program is given, the memory device 103 reads out the program from the auxiliary storage device 102 and stores the program. The CPU 104 executes functions related to the system migration support apparatus 10 according to the program stored in the memory device 103. The interface device 105 is used as an interface for connecting to a network.

Figure 3:
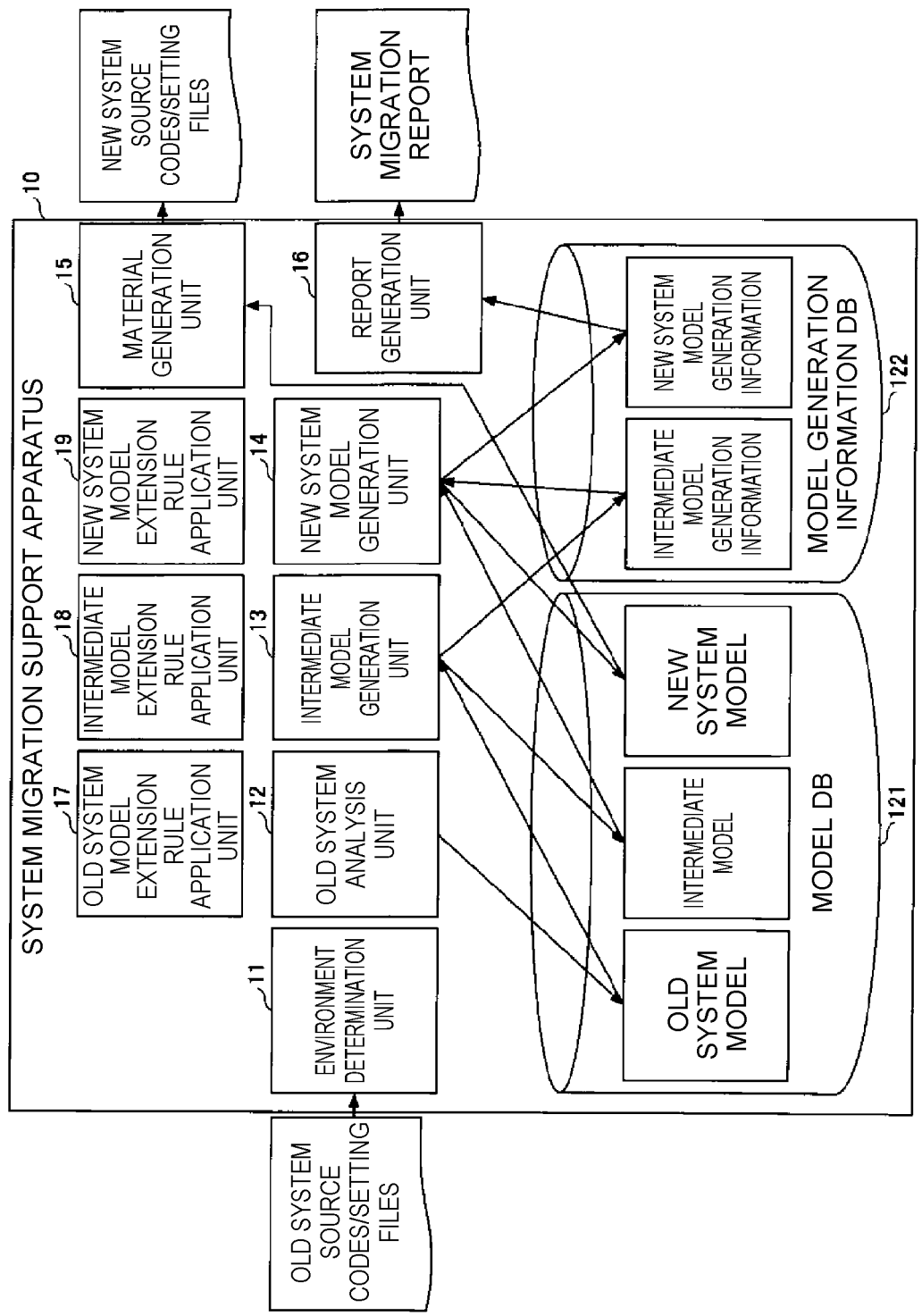
FIG. 3 is a diagram showing a functional configuration example of the system migration support apparatus 10 in the embodiment of the present invention.

FIG. 3 is a diagram showing a functional configuration example of the system migration support apparatus 10 in the embodiment of the present invention. In FIG. 3, the system migration support apparatus 10 includes an environment determination unit 11, an old system analysis unit 12, an intermediate model generation unit 13, a new system model generation unit 14, a material generation unit 15, a report generation unit 16, an old model extension rule application unit 17, an intermediate model extension rule application unit 18, a new model extension rule application unit 19 and the like. These units are realized by processes that one or more programs installed in the system migration support apparatus 10 cause the CPU 104 to execute. The system migration support apparatus 10 uses databases (DBs) such as a model DB 121 and a model generation information DB 122. These DBs can be realized, for example, using a storage device or the like connectable to the auxiliary storage device 102 or the system migration support apparatus 10 via a network.

The environment determination unit 11 determines which programming languages and which libraries, frameworks and the like are used by all materials (files of source codes (hereinafter referred to as "source files", setting files and the like) included in an old system, and information (hereinafter, referred to as "old environment information") showing what are versions thereof, (that is, information showing an implementation environment or a system environment that the old system depends on (hereinafter referred to as "an old implementation environment")). Here, the old system is, for example, a computer system such as a web system and refers to a system to be a migration source relative to a new system to be a migration destination (hereinafter referred to as "a new system"). The environment determination unit 11 further determines (identifies) information (hereinafter referred to as "new environment information") showing an implementation environment or a system environment that the new system depends on (hereinafter referred to as "a new implementation environment") based on the old environment information. The old environment information and the new environment information will be referred to simply as "environment information" when both are not discriminated from each other.

The old system analysis unit 12 generates data showing information about an operation of the old system (a process executed by the old system) in a form depending on an implementation technique of the old system (hereinafter referred to as "an old system model") based on the materials of the old system, and stores the generated old system model into the model DB 121. Note that an old system model generation method (generation rules) is defined beforehand, for example, in a plurality of old system model generation rules stored in the auxiliary storage device 102. In other words, the old system analysis unit 12 applies each of the old system model generation rules to the source files and setting files of the old system model to generate the old system model.

The old model extension rule application unit 17 changes the existing old system model generation rules to content suitable for migration to the new system, based on a conversion method corresponding to a combination of old environment information and new environment information determined by the environment determination unit 11.

The intermediate model generation unit 13 generates data showing the information about the operation of the old system in a general-purpose form not depending on a particular implementation technique (hereinafter referred to as "an intermediate model") based on the old system model and stores the generated intermediate model into the model DB 121. The information about the operation of the old system includes a static data structure, algorithms for processes to be executed, a GUI (graphical user interfaces), screen transitions and the like in the old system. The intermediate model generation unit 13 also generates correspondence information showing correspondence relationships between portions of the old system model and portions of the intermediate model (hereinafter referred to as "intermediate model generation information") together with the intermediate model and stores the generated intermediate model generation information into the model generation information DB 122. Note that a method (generation rules)

for generating the intermediate model and the intermediate model generation information is defined beforehand, for example, in a plurality of intermediate model generation rules stored in the auxiliary storage device 102. In other words, the intermediate model generation unit 13 applies each of the intermediate model generation rules to the old system model to generate the intermediate model and the intermediate model generation information.

The intermediate model extension rule application unit 18 changes the existing intermediate model generation rules to content suitable for migration to the new system, based on the conversion method corresponding to the combination of the old environment information and the new environment information determined by the environment determination unit 11.

The new system model generation unit 14 refers to the intermediate model generation information to identify the portions of the old system model corresponding to the portions of the intermediate model. Then, based on each of the identified portions, the new system model generation unit 14 generates data showing the information about the operation of the old system in a form depending on an implementation technique of the new system for a configuration of the new system, APIs to be used, and the like (hereinafter referred to as "a new system model") and stores the generated new system model into the model DB 121. The new system model generation unit 14 also generates correspondence information showing correspondence relationships between the portions of the intermediate model and portions of the new system model (hereinafter referred to as "new system model generation information") together with the new system model and stores the generated new system model generation information into the model generation information DB 122. Note that a generation method (generation rules) for the new system model and the new system model generation information is defined beforehand, for example, in a plurality of new system model generation rules stored in the auxiliary storage device 102. In other words, the new system model generation unit 14 applies each new system model generation rule to the intermediate model and the intermediate model generation information to generate the new system model and the new system model generation information.

The material generation unit 15 applies, for example, new system material generation rules stored in the auxiliary storage device 102 to the new system model to generate materials (source files, setting files and the like) of the new system.

The new model extension rule application unit 19 changes the existing new system model generation rules to content suitable for migration to the new system, based on the conversion method corresponding to the combination of the old environment information and the new environment information determined by the environment determination unit 11.

The report generation unit 16 generates information including a correspondence relationship between the old system and the new system and the like (hereinafter referred to as a "report") that assists at the time of manually performing complementary work for the materials of the new system generated by the material generation unit 15, based on the new system model generation information and the intermediate model generation information. Note that a generation method (generation rules) for the report is defined beforehand, for example, in a plurality of report generation rules stored in the auxiliary storage device 102. In other words, the report generation unit 16 applies each report generation rule to the new system model generation information and the intermediate model generation information to generate the report.

Figure 4:
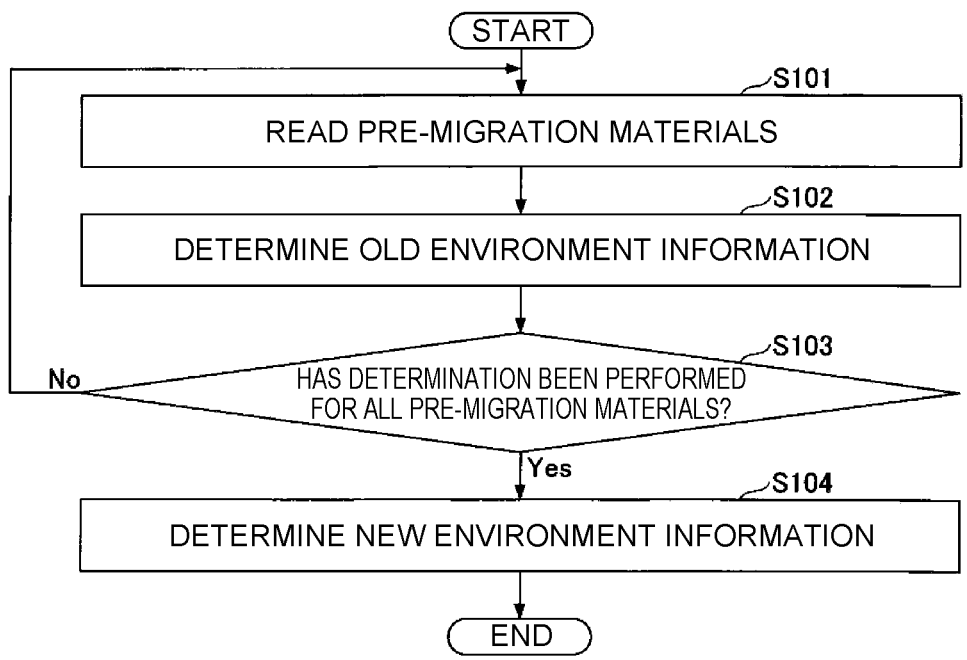
FIG. 4 is a flowchart for illustrating an example of a processing procedure executed by an environment determination unit 11.

A processing procedure execute by the system migration support apparatus 10 will be described below. FIG. 4 is a flowchart for illustrating an example of a processing procedure executed by the environment determination unit 11.

At step S101, the environment determination unit 11 reads one pre-migration material (hereinafter referred to as "a target pre-migration material") into the memory device 103. The pre-migration material refers to a source file of an old system.

Next, the environment determination unit 11 identifies a programming language and libraries used by the target pre-migration material and versions thereof (that is, old environment information related to the target pre-migration material) (S102). For example, the old environment information related to the target pre-migration material may be identified from a jar file and the like included in the target pre-migration material. Specifically, the environment determination unit 11 can identify the programming language and the version thereof by referring to content of the target pre-migration material. Further, the environment determination unit 11 can access the libraries used by the target pre-migration material to identify the versions of the libraries, in the environment in which the old system is constructed.

When steps S101 and S102 have been executed for all pre-migration materials (source files) (S103: Yes), the environment determination unit 11 determines (identifies) new environment information based on the old environment information determined by the process so far (S103). Here, the old environment information may be such that is obtained by integrating determination results of the materials (after exclusion of duplication of each determination result) or may be a set of the determination results of the materials.

Determination of the new environment information based on the old environment information may be performed on a rule basis. A rule on the rule basis is a conversion rule with the old environment information as an input and the new environment information as an output, which is defined beforehand. Such a rule may be defined based on rule of thumb. For example, if there is an actual result (rule of thumb) that, in many cases, a migration destination of Struts of the Java (registered trademark) language is Spring of the Java (registered trademark) language, then, based on such an actual result, a rule may be defined that, if a framework of old environment information is Struts, Spring is identified as a framework of new environment information.

Note that, since there may be a case where conditions after migration are specified, the new environment information may be specified by a user. Further, the old environment information may be inputted by the user because the user knows the old environment information. However, by causing the environment information to be determined by the environment determination unit 11, a burden on the user can be reduced.

Figure 5:
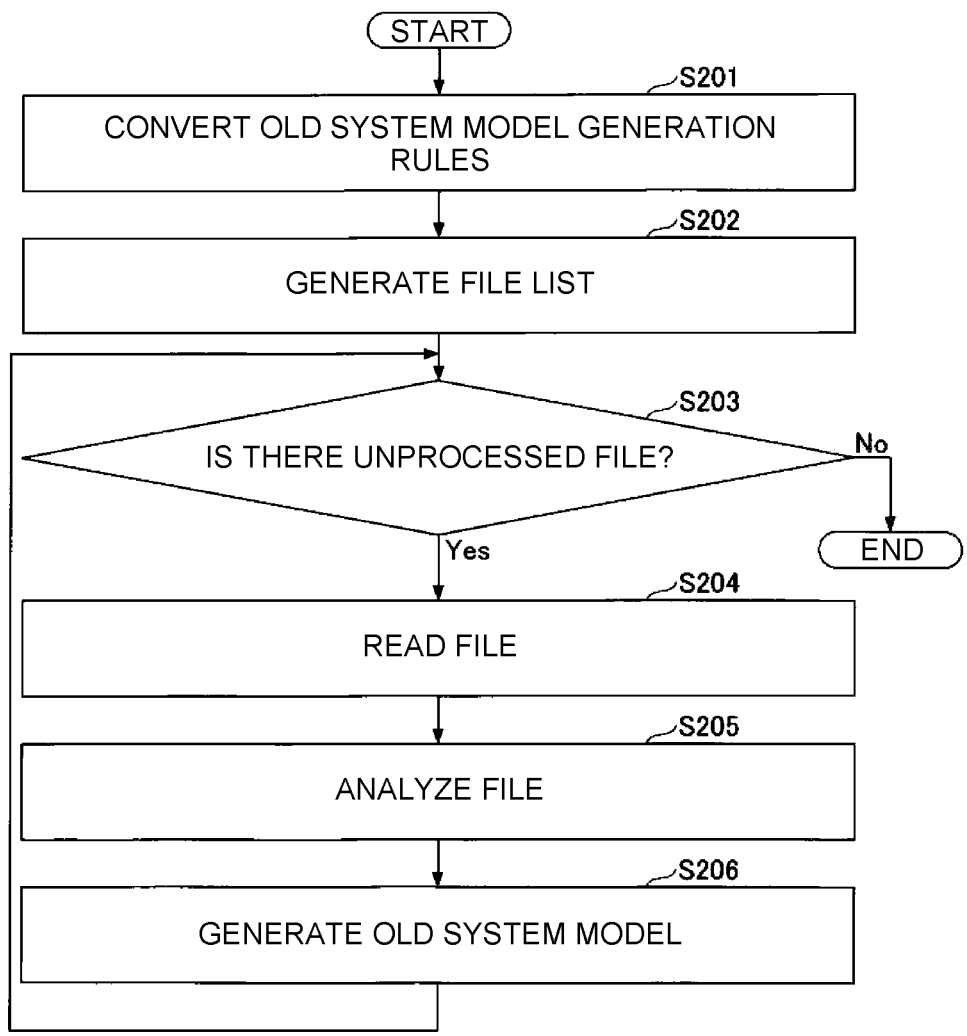
FIG. 5 is a flowchart for illustrating an example of a processing procedure executed by an old system analysis unit 12.

FIG. 5 is a flowchart for illustrating an example of a processing procedure executed by the old system analysis unit 12. The processing procedure of FIG. 5 is executed after the processing procedure of FIG. 4 ends.

At step S201, the old system analysis unit 12 converts an existing old system model generation rule group to content suitable for migration to a new system by calling the old model extension rule application unit 17. At this time, the existing old system model generation rule group is inputted to the old model extension rule application unit 17. The old system analysis unit 12 receives the old system model generation rule group after being converted, as output information from the old model extension rule application unit 17.

Next, the old system analysis unit 12 inputs the source files and setting files of the old system and generates a list of these files (hereinafter referred to as "a file list") (S202).

Next, the old system analysis unit 12 determines whether or not step S204 and subsequent steps have been executed for all the files included in the generated file list (S203). If there are files for which step S204 and the subsequent steps have not been executed (S203: Yes), the old system analysis unit 12 reads, with one file (hereinafter referred as a "target file") among the unprocessed files as a processing target, the content of the target file into the memory device 103 (S204).

Next, the old system analysis unit 12 analyzes the content of the target file (S205). Specifically, the old system analysis unit 12 performs lexical analysis and parsing according to the file type (such as source file and setting file) for the target file and converts the content of the target file to tree-structured data suitable for processing by a calculator.

Next, the old system analysis unit 12 applies the plurality of old system model generation rules to the tree-structured data to generate an old system model, and stores the old system model into the model DB 121 (S206).

The old system model generation rules refers to data in which rules are defined, the rules being for classifying the source files and the setting files according to conditions such as file classifications, commonality among character strings included in file names, commonality among character strings constituting paths on a system, and whether a particular API is used or not, and generating a model (data) holding a parameter specified for each classification as an old system model. The old system model generation rules are created by a person who understands implementation of the old system. For example, the old system model generation rules may be created for each of the classifications. It is because there is a possibility that a parameter configuration and a parameter expression form differ for each classification and that a data format of (a portion of) the generated old system model differs for each classification that parameters are specified for each classification. In other words, the conditions, such as the file type, the commonality among character strings included in file names, the commonality among character strings constituting paths on the system, and whether a particular API is used or not, which are described above, are examples of a condition for distinguishing differences between data formats (parameter formats) at the time of conversion to the old system model, and if another condition is appropriate from such a point of view, source file groups and setting file groups may be classified based on the other condition. Note that the old system model generation rules are dependent on an implementation technique such as a programming language and frameworks used for implementation of the old system. Therefore, information dependent on the implementation technique, such as information about types (data) dependent on a particular programming language and a name of an API dependent on a particular library, can be included in parameters that the old system model has.

When steps S204 to S206 described above have been executed for all the files included in the file list (S203: No), the old system analysis unit 12 ends the process.

Figure 6:
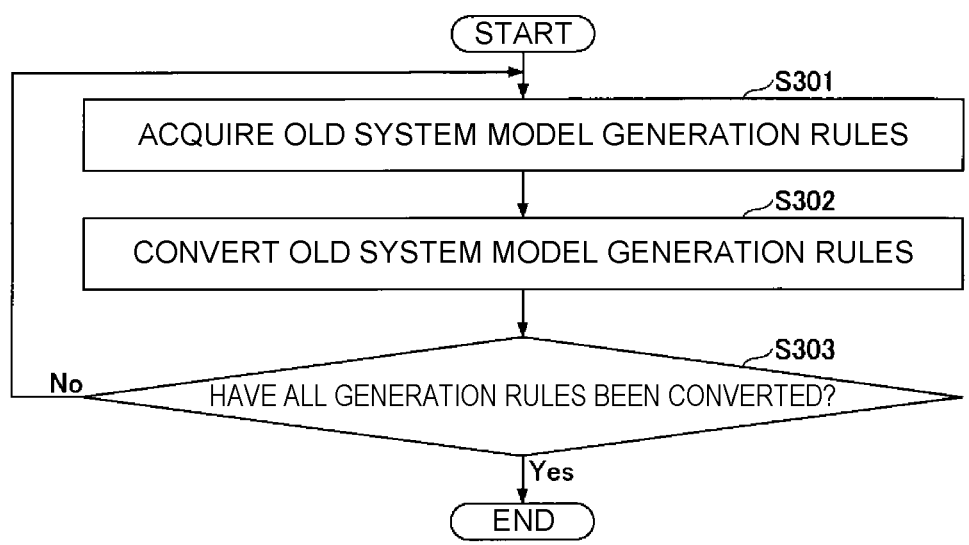
FIG. 6 is a flowchart for illustrating an example of a processing procedure executed by an old model extension rule application unit 17.

FIG. 6 is a flowchart for illustrating an example of a processing procedure executed by the old model extension rule application unit 17. The processing procedure of FIG. 6 is called at step S201 of FIG. 5.

At step S301, the old model extension rule application unit 17 acquires one old system model generation rule in the old system model generation rule group inputted from the old system analysis unit 12, as a processing target (hereinafter referred to as "a target generation rule").

Next, the old model extension rule application unit 17 applies old model extension rules to the target generation rule to correct, add or delete the old system model generation rules (S302). Correction of the old system model generation rules refers to change of a part of the target generation rule. Addition to the old system model generation rules refers to addition of a new old system model generation rule (for example, addition of "e" when "a", "b" and "c" exist as the old system model generation rules). Deletion from the old system model generation rules refers to deletion of the target generation rule. Note that, for conversion of the intermediate model generation rules and conversion of the new system model generation rules, the meaning of correction, addition or deletion is similar.

In the old model extension rules, for example, a conversion method (correction, addition and deletion) according to a combination of old environment information and new environment information is defined beforehand for each of the old system model generation rules. Therefore, the old model extension rule application unit 17 converts the target generation rule based on a conversion method identified by applying the set of the old environment information and the new environment information determined by the environment determination unit 11 to the old model extension rules.

When steps S301 and S302 have been executed for all the old system model generation rules inputted from the old system analysis unit 12 (S303: Yes), the old model extension rule application unit 17 ends the process.

Figure 7:
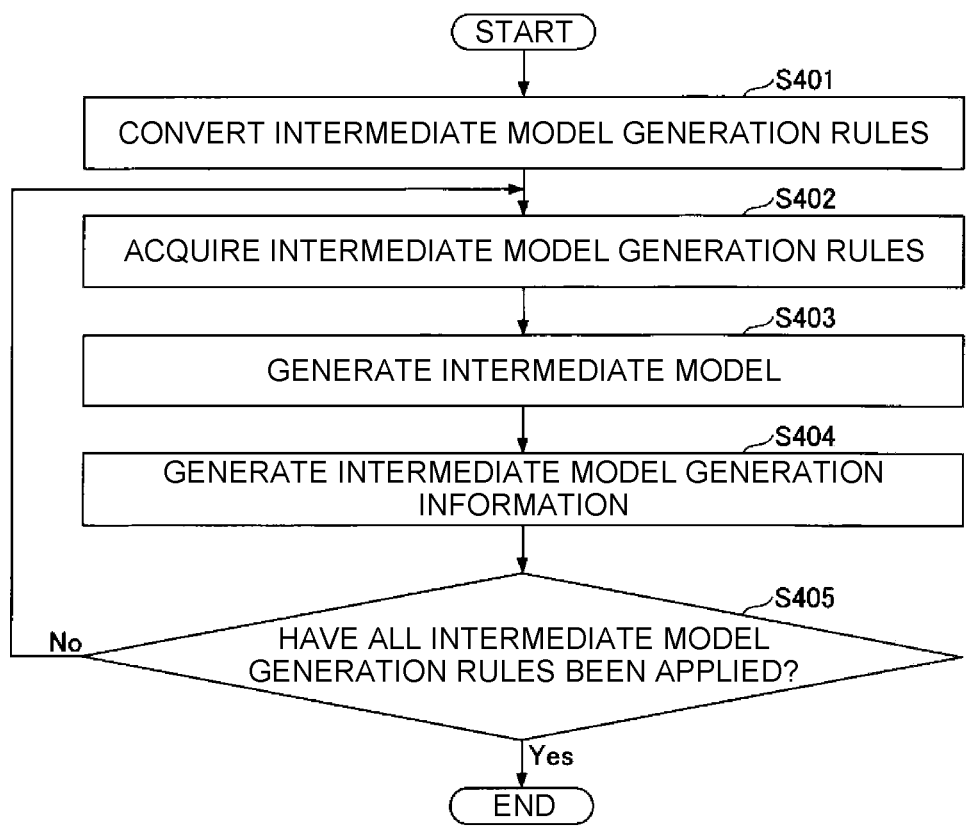
FIG. 7 is a flowchart for illustrating an example of a processing procedure executed by an intermediate model generation unit 13.

FIG. 7 is a flowchart for illustrating an example of a processing procedure executed by the intermediate model generation unit 13. The processing procedure of FIG. 7 is executed after the processing procedure of FIG. 5 ends.

At step S401, the intermediate model generation unit 13 converts an existing intermediate model generation rule group to content suitable for migration to the new system by calling the intermediate model extension rule application unit 18. At this time, the intermediate model generation rule group is inputted to the intermediate model extension rule application unit 18. The intermediate model generation unit 13 receives the intermediate model generation rule group after being converted, as output information from the intermediate model extension rule application unit 18.

Next, the intermediate model generation unit 13 acquires one unapplied intermediate model generation rule (hereinafter referred to as "a target rule") among the plurality of intermediate model generation rules included in the output information, as an application target. The plurality of intermediate model generation rules are applied to different application positions (application portions) of the old system model, respectively. In other words, the old system model is not necessarily expressed in a unified data format through the whole. For example, a data format after conversion to the old system model may differ according to the classifications described above. Therefore, for example, the intermediate model generation rules may be created for each of the classifications described above.

Next, the intermediate model generation unit 13 applies the target rule to a position (a portion) corresponding to the target rule in the old system model in the model DB 121 to generate a portion of an intermediate model corresponding to the portion, and stores the portion of the intermediate model into the model DB 121 (S403).

The intermediate model generation rules refers to data in which rules are defined, the rules being for extracting parameters related to a static data structure, algorithms for processes, a GUI and screen transitions from the old system model to generate a model (data) that includes the parameters, as the intermediate model in a form not depending on a particular implementation technique, and generating intermediate model generation information about the intermediate model. The intermediate model generation rules are created by a person who understands the implementation of the old system.

Next, the intermediate model generation unit 13 generates intermediate model generation information that includes the target rule, the position (the portion) of the old system model to which the target rule is applied and the position (the portion) of the intermediate model generated as a result, based on the target rule and stores the intermediate model generation information into the model generation information DB 122 (S404). In other words, the intermediate model generation information is information showing a correspondence relationship between the position (the portion) of the old system model and the position (the portion) of the intermediate model, and showing by what conversion process the position of the intermediate model has been generated. As for "what conversion process", it is expressed by the target rule. Note that, here, the position (the portion) of the intermediate model refers to a position (a portion) of the intermediate model when a set of parts of intermediate models generated by all the intermediate model generation rules is grasped as one intermediate model. In other words, each intermediate model generation rule generates a portion of the intermediate model that is finally generated. Therefore, the position (the portion) is the portion of the intermediate model generated at step S403. Note that data formats of the positions (the portions) of the intermediate model may be mutually different.

When steps S402 to S404 have been executed for all the intermediate model generation rules (S405: Yes), the intermediate model generation unit 13 ends the process.

Figure 8:
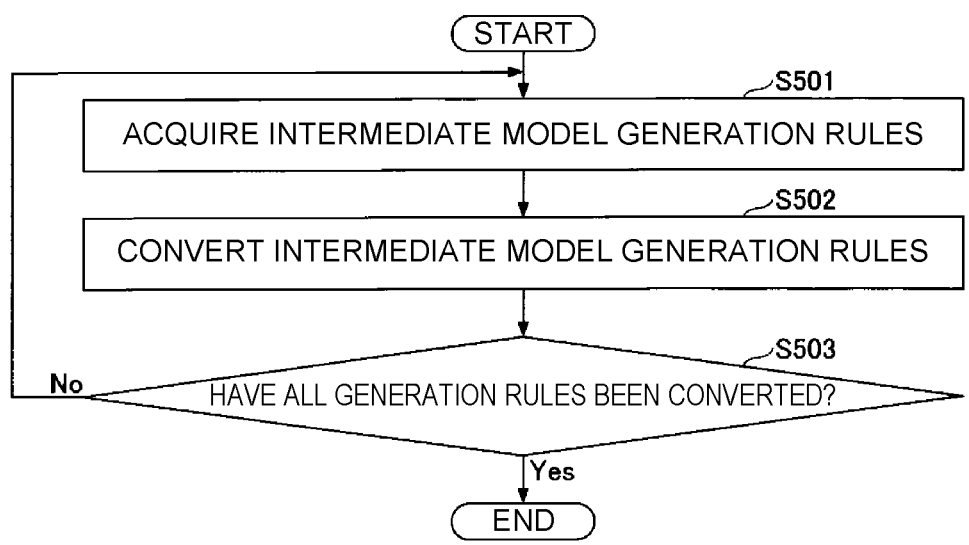
FIG. 8 is a flowchart for illustrating an example of a processing procedure executed by an intermediate model extension rule application unit 18.

FIG. 8 is a flowchart for illustrating an example of a processing procedure executed by the intermediate model extension rule application unit 18. The processing procedure of FIG. 8 is called at step S401 of FIG. 7.

At step S501, the intermediate model extension rule application unit 18 acquires one intermediate model generation rule in the intermediate model generation rule group inputted from the intermediate model generation unit 13, as a processing target (hereinafter referred to as "a target generation rule").

Next, the intermediate model extension rule application unit 18 applies intermediate model extension rules to the target generation rule to correct, add or delete the intermediate model generation rules (S502).

In the intermediate model extension rules, for example, a conversion method (correction, addition and deletion) according to a combination of old environment information and new environment information is defined beforehand for each intermediate model generation rule. Therefore, the intermediate model extension rule application unit 18 converts the target generation rule based on a conversion method identified by applying the set of the old environment information and the new environment information determined by the environment determination unit 11 to the intermediate model extension rules.

When steps S501 and S502 have been executed for all the intermediate model generation rules inputted from the intermediate model generation unit 13 (S503: Yes), the intermediate model extension rule application unit 18 ends the process.

Figure 9:
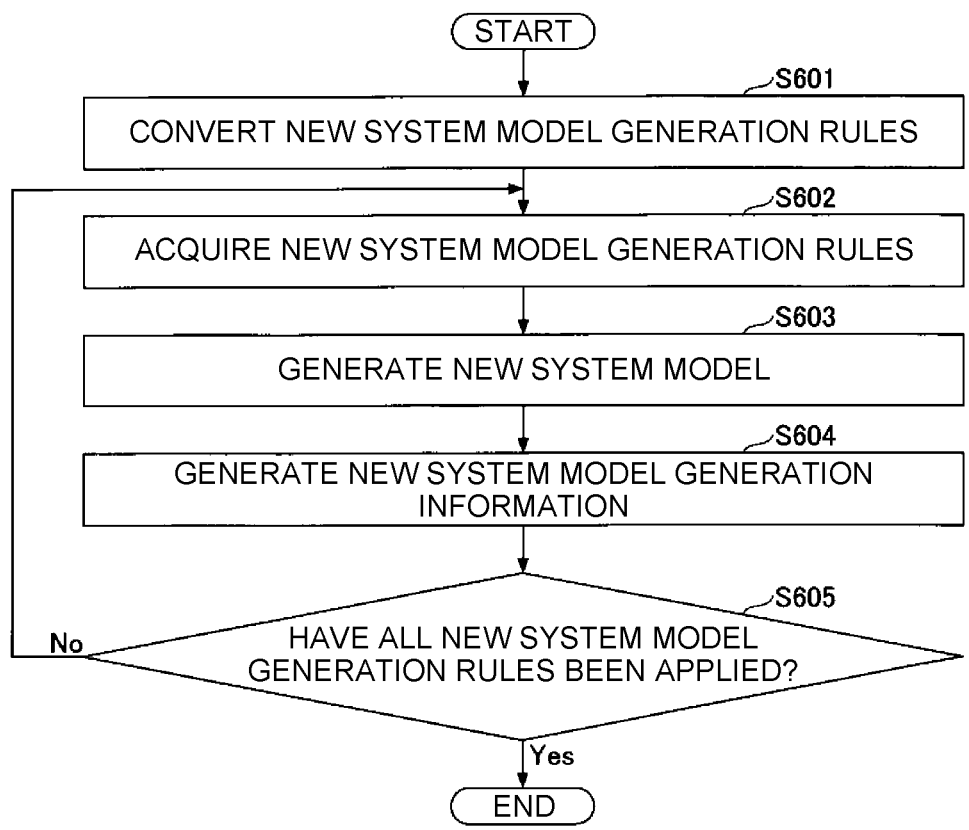
FIG. 9 is a flowchart for illustrating an example of a processing procedure executed by a new system model generation unit 14.

FIG. 9 is a flowchart for illustrating an example of a processing procedure executed by the new system model generation unit 14. The processing procedure of FIG. 9 is executed after the processing procedure of FIG. 7 ends.

At step S601, the new system model generation unit 14 converts an existing new system model generation rule group to content suitable for migration to the new system by calling the new model extension rule application unit 19. At this time, the new system model generation rule group is inputted to the new model extension rule application unit 19. The new system model generation unit 14 receives the new system model generation rule group after being converted, as output information from the new model extension rule application unit 19.

Next, the new system model generation unit 14 acquires one unapplied new system model generation rule (hereinafter referred to as "a target rule") among the plurality of new system model generation rules included in the output information, from the auxiliary storage device 102 as an application target. The plurality of new system model generation rules are applied to different application positions (application portions) of the intermediate model, respectively. In other words, the intermediate model is not necessarily expressed in a unified data format through the whole. For example, a data format after conversion to the intermediate model may differ according to the classifications described above. Therefore, for example, the new system model generation rules may be created for each of the classifications described above.

Next, for each of the intermediate model and the intermediate model generation information in the model DB 121, the new system model generation unit 14 applies the target rule to the position (the portion) corresponding to the target rule to generate a portion of a new system model, and stores the portion of the new system model into the model DB 121 (S603).

The new system model generation rules refers to data in which rules are defined, the rules being for determining a configuration of the new system, APIs to be used and the like by a static data structure of the intermediate model, algorithms of processes, a GUI, various kinds of parameters related to screen transition, and implementation details of the intermediate model recorded as the intermediate model generation information in the old system (the static data structure, the algorithms of processes, the GUI and the parameters related to screen transitions from the old system model), and generating a model holding them as parameters as a new system model. The new system model generation rules are created by a person who understands the implementation of the old system and the implementation of the new system. In other words, based on the position (the portion) corresponding to the target rule in the intermediate model generation information, the new system model generation unit 14 identifies a position corresponding to the target rule in the old system model. The new system model generation unit 14 generates a portion of the new system model based on the position (the portion) corresponding to the target rule in the intermediate model and the position (the portion) corresponding to the target rule in the old system model. Here, by not only the intermediate model but also the position (the portion) corresponding to the target rule in the old system model being directly referred to (traced) based on the intermediate model generation information, details of the implementation information about the old system, which is missed in the conventional technique, can be reflected on the new system model. For example, the API name and the like dependent on the implementation technique of the old system can be converted to an API name and the like dependent on the implementation technique of the new system.

Next, the new system model generation unit 14 generates new system model generation information that includes the target rule, the position (the portion) of the intermediate model to which the target rule is applied and the position (the portion) of the new system model generated as a result, based on the target rule and stores the new system model generation information into the model generation information DB 122 (S604). In other words, the new system model generation information is information showing a correspondence relationship between the position (the portion) of the intermediate model and the position (the portion) of the new system model, and showing by what conversion process the position (the portion) of the new system model has been generated. As for "what conversion process", it is expressed by the target rule. Note that, here, the position (the portion) of the new system model refers to a position (a portion) of the new system model when a set of parts of new system models generated by all the new system model generation rules is grasped as one new system model. In other words, each new system model generation rule generates a portion of the new system model that is finally generated. Therefore, the position (the portion) is the portion of the new system model generated at step S603. Note that data formats of the positions (the portions) of the new system model may be mutually different.

When steps S602 to S604 have been executed for all the new system model generation rules (S605: Yes), the new system model generation unit 14 ends the process.

Figure 10:
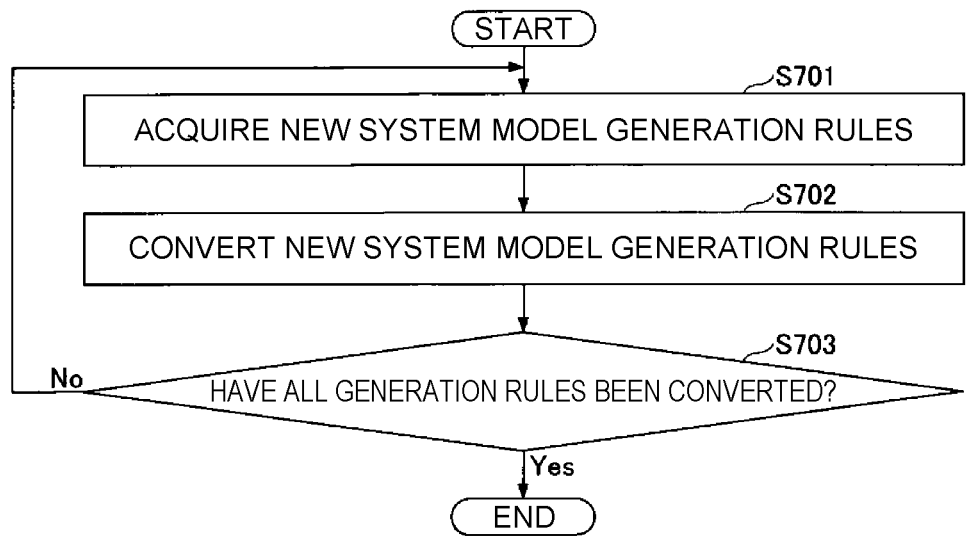
FIG. 10 is a flowchart for illustrating an example of a processing procedure executed by a new model extension rule application unit 19.

FIG. 10 is a flowchart for illustrating an example of a processing procedure executed by the new model extension rule application unit 19. The processing procedure of FIG. 10 is called at step S601 of FIG. 9.

At step S701, the new model extension rule application unit 19 acquires one new system model generation rule in the new system model generation rule group inputted from the new system model generation unit 14, as a processing target (hereinafter referred to as "a target generation rule").

Next, the new model extension rule application unit 19 applies new model extension rules to the target generation rule to correct, add or delete the new system model generation rules (S702).

In the new model extension rules, for example, a conversion method (correction, addition and deletion) according to a combination of old environment information and new environment information is defined beforehand for each of the new system model generation rules. Therefore, the new model extension rule application unit 19 converts the target generation rule based on a conversion method identified by applying the set of the old environment information and the new environment information determined by the environment determination unit 11 to the new model extension rules.

When steps S701 and S702 have been executed for all the new system model generation rules inputted from the new system model generation unit 14 (S703: Yes), the new model extension rule application unit 19 ends the process.

Figure 11:
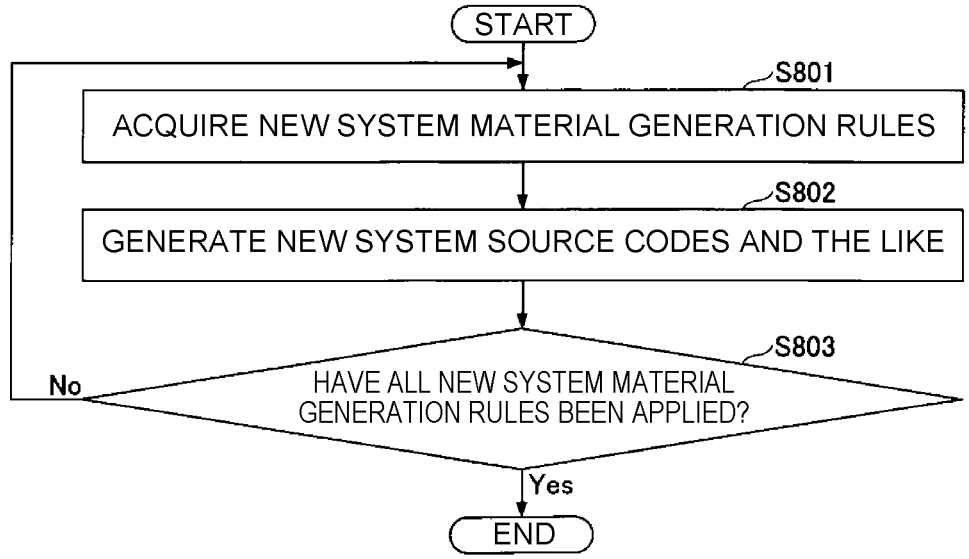
FIG. 11 is a flowchart for illustrating an example of a processing procedure executed by a material generation unit 15.

FIG. 11 is a flowchart for illustrating an example of a processing procedure executed by the material generation unit 15. The processing procedure of FIG. 11 is executed after the processing procedure of FIG. 9 ends.

At step S801, the material generation unit 15 acquires one unapplied new system material generation rule (hereinafter referred to as "a target rule") among a plurality of new system material generation rules, from the auxiliary storage device 102 as an application target. The plurality of new system material generation rules are applied to different application positions (application portions) of the new system model, respectively. In other words, the new system model is not necessarily expressed in a unified data format through the whole. For example, a data format after conversion to the new system model may differ according to the classifications described above. Therefore, for example, the new system material generation rules may be created for each of the classifications described above.

Next, the material generation unit 15 applies the target rule to a position (a portion) corresponding to the target rule in the new system model in the model DB 121 to generate a portion of each of source files (source codes) and setting files of the new system (S802). The generated portion of each of the source files and setting files is stored into the auxiliary storage device 102 or the like.

The new system material generation rules refers to data in which rules for generating the content of the source files and setting files of the new system as character strings, using information about configurations of the source files and the setting files held by the new system model and the used API are defined. The material generation unit 15 outputs the generated character strings as source files or setting files of the new system using information such as the file names, the file paths and the like held by the new system model.

When steps S801 and S802 have been executed for all the new system material generation rules (S803: Yes), the material generation unit 15 ends the process.

Figure 12:
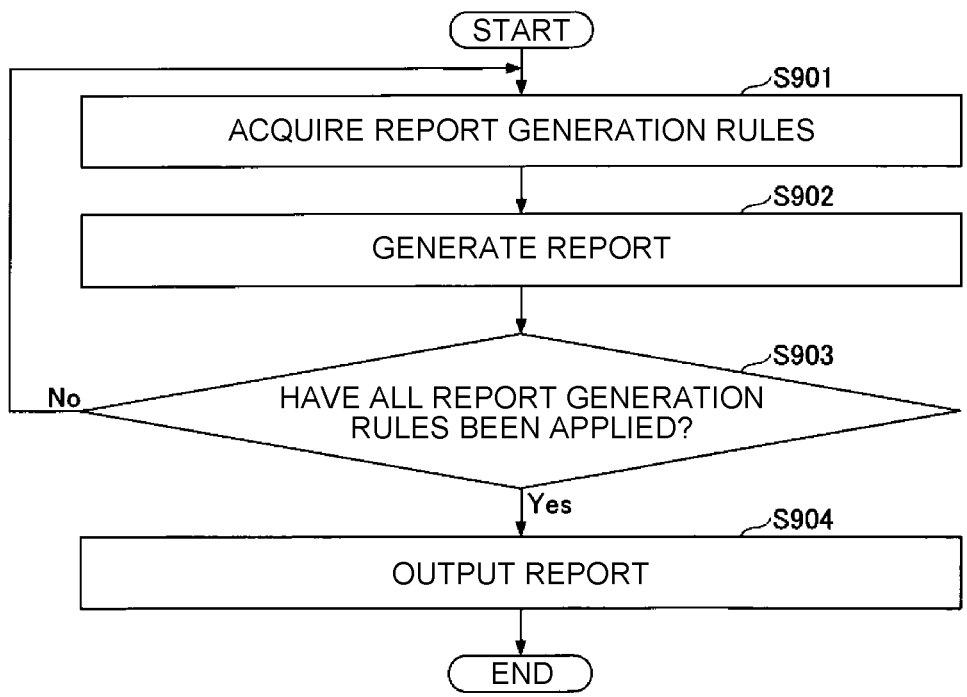
FIG. 12 is a flowchart for illustrating an example of a processing procedure executed by a report generation unit 16.

FIG. 12 is a flowchart for illustrating an example of a processing procedure executed by the report generation unit 16. The processing procedure of FIG. 12 is executed after the processing procedure of FIG. 11 ends.

At step S901, the report generation unit 16 acquires one unapplied report generation rule (hereinafter referred to as a "target rule") among the plurality of report generation rules, from the auxiliary storage device 102 as an application target. The plurality of report generation rules are applied to different application positions (application portions) of the new system model generation information, respectively. In other words, the new system model generation information is not necessarily expressed in a unified data format through the whole. For example, a data format after conversion to the new system model generation information may differ according to the classifications described above. Therefore, for example, the report generation rules may be created for each of the classifications described above.

Next, the report generation unit 16 applies the target rule to the positions (the portions) corresponding to the target rule in the new system model generation information and the intermediate model generation information stored in the model generation information DB 122 to generate a portion of a report (S902).

The report generation rules refers to data in which rules are defined, the rules being for generating a report that includes information showing correspondence relationships between (portions of) the new system and (portions of) the old system, and information showing content of work and an estimated amount of the work at the time of manually complementing new system source files and setting files, based on new system model generation rules applied to positions (portions) of the intermediate model that are generation sources of parts of the new system model and the positions (the portions) of the intermediate model, and intermediate model generation rules applied to positions (portions) of the old system model that are generation sources of the positions (the portions) of the intermediate model and the positions (the portions) of the old system mode, which are included in the new system model generation information. The report generation rules are created by a person who understands the implementation of each of the old system and the new system.

At step S902, a correspondence relationship between the position (the portion) corresponding to the target rule in the new system model and the position (the portion) corresponding to the target rule in the old system model is identified. The position (the portion) corresponding to the target rule in the old system model can be identified by referring to the position (the portion) in the intermediate model generation information identified based on the position (the portion) corresponding to the target rule in the new system model generation information. In other words, the position (the portion) of the intermediate model generation information includes information showing a position (a portion) of the old system model to which intermediate model generation information corresponding to the position (the portion) of the intermediate model corresponding to the position (the portion) is applied.

When steps S901 and S902 have been executed for all the report generation rules (S903: Yes), the report generation unit 16 integrates portions of reports and outputs them as a file (S904).

As described above, according to the present embodiment, existing old system model generation rules, intermediate model generation rules or new system model generation rules are automatically converted to content suitable for migration from a particular old system to a particular new system by the old model extension rule application unit 17, the intermediate model extension rule application unit 18 and the new model extension rule application unit 19. Therefore, it is possible to improve utilization of definition information for system migration.

Note that, in existing techniques, it is necessary to generate an old system model, a general-purpose intermediate model and a new system model for each development project. Or alternatively, it is necessary to perform rewriting based on models for a previous project. Even in the case of reusing models for a previous project, rules are such that are optimized for requirements of a reuse source project, and the range of reuse is limited.

On the other hand, according to the present embodiment, it is not necessary to add rules fora development project, or it is possible to perform migration by adding minimum necessary rules for portions specialized for the project.

Note that, in the present embodiment, the system migration support apparatus 10 is an example of a conversion apparatus. The old system is an example of a first system. The new system is an example of a second system. The old system model is an example of first data. The intermediate model is an example of second data. The new system model is an example of third data. The old system model generation rules are an example of definition information about first rules. The intermediate model generation rules are an example of definition information about second rules. The new system model generation rules are an example of definition information about third rules. The old model extension rule application unit 17 is an example of a first conversion unit. The intermediate model extension rule application unit 18 is an example of a second conversion unit. The new model extension rule application unit 19 is an example of a third conversion unit. The old implementation environment information is an example of first environment information. The new implementation environment information is an example of second environment information.

An embodiment of the present invention has been described in detail above. The present invention is, however, not limited to such a particular embodiment, and various modifications and changes are possible within a scope of the spirit of the present invention described in Claims.

REFERENCE SIGNS LIST

10 System migration support apparatus
11 Environment determination unit
12 Old system analysis unit
13 Intermediate model generation unit
14 New system model generation unit
15 Material generation unit
16 Report generation unit
17 Old model extension rule application unit
18 Intermediate model extension rule application unit
19 New model extension rule application unit
100 Drive device
101 Recording medium
102 Auxiliary storage device
103 Memory device
104 CPU
105 Interface device
121 Model DB
122 Model generation information DB
B Bus

The invention claimed is:

1. A conversion apparatus comprising a processor configured to execute a method comprising:
converting definition information about first rules for generating first data showing information about an operation of a first system associated with a migration source in a form depending on an implementation technique of the first system based on materials of the first system, according to a combination of first environment information showing an environment that the first system depends on and second environment information showing an environment that a second system associated with a migration destination depends on;
converting definition information about second rules for generating second data showing the information about the operation in a form not depending on an implementation technique based on the first data, according to the combination of the first environment information and the second environment information; and
converting definition information about third rules for generating third data showing the information about the operation in a form depending on an implementation technique of the second system based on the second data and the first data, according to the combination of the first environment information and the second environment information.

2. The conversion apparatus according to claim 1, the processor further configured to execute a method comprising:
determining the information showing the environment that the first system depends on and the information showing the environment that the second system depends on, based on the materials of the first system.

3. A method comprising:
converting definition information about first rules for generating first data showing information about an operation of a first system associated with a migration source in a form depending on an implementation technique of the first system based on materials of the first system, according to a combination of first environment information showing an environment that the first system depends on and second environment information showing an environment that a second system associated with a migration destination depends on;
converting definition information about second rules for generating second data showing the information about the operation in a form not depending on an implementation technique based on the first data, according to the combination of the first environment information and the second environment information; and
converting definition information about third rules for generating third data showing the information about the operation in a form depending on an implementation technique of the second system based on the second data and the first data, according to the combination of the first environment information and the second environment information.

4. The method according to claim 3, the method further comprising:
determining the information showing the environment that the first system depends on and the information showing the environment that the second system depends on, based on the materials of the first system.

5. A system configured to execute program instructions configured to execute a method comprising:
converting definition information about first rules for generating first data showing information about an operation of a first system associated with a migration source in a form depending on an implementation technique of the first system based on materials of the first system, according to a combination of first environment information showing an environment that the first system depends on and second environment information showing an environment that a second system associated with a migration destination depends on;
converting definition information about second rules for generating second data showing the information about the operation in a form not depending on an implementation technique based on the first data, according to the combination of the first environment information and the second environment information; and
converting definition information about third rules for generating third data showing the information about the operation in a form depending on an implementation technique of the second system based on the second data and the first data, according to the combination of the first environment information and the second environment information.

6. The conversion apparatus according to claim 1, wherein the materials include a source file.

7. The method according to claim 3, wherein the materials include a source file.

8. The system according to claim 5, the program instructions further configured to execute a method comprising:
determining the information showing the environment that the first system depends on and the information showing the environment that the second system depends on, based on the materials of the first system.

9. The system according to claim 5, wherein the materials include a source file.

* * * * *